US012686357B2

(12) United States Patent
McRoberts et al.

(10) Patent No.: US 12,686,357 B2
(45) Date of Patent: Jul. 21, 2026

(54) OCCUPANT SAFETY RESTRAINT SYSTEM

(71) Applicant: EVENFLO COMPANY INC.,
Miamisburg, OH (US)

(72) Inventors: Jason Kyle McRoberts, Mason, OH
(US); Bryan Ray Adams, Beavercreek,
OH (US); Eric Dahle, Ludlow Falls,
OH (US); Brian Whitt, Dayton, OH
(US); Bingqing Zhou, Kunshan (CN);
Zhiyong Kuang, Kunshan (CN)

(73) Assignee: EVENFLO COMPANY INC.,
Miamisburg, OH (US)

( * ) Notice: Subject to any disclaimer, the term of this
patent is extended or adjusted under 35
U.S.C. 154(b) by 334 days.

(21) Appl. No.: 18/500,913

(22) Filed: Nov. 2, 2023

(65) Prior Publication Data

US 2025/0145108 A1     May 8, 2025

(51) Int. Cl.
| | |
|---|---|
| B60R 22/18 | (2006.01) |
| B60N 2/26 | (2006.01) |
| B60R 22/02 | (2006.01) |

(52) U.S. Cl.
CPC .............. B60R 22/18 (2013.01); B60N 2/265
(2013.01); *B60R 2022/027* (2013.01); *B60R*
*2022/1818* (2013.01)

(58) Field of Classification Search
CPC ................................ B60R 22/18; B60N 2/265
USPC ......................................................... 297/484
See application file for complete search history.

(56) References Cited

U.S. PATENT DOCUMENTS

| | | | |
|---|---|---|---|
| 5,294,183 A | 3/1994 | Wetter et al. | |
| 6,338,529 B1 | 1/2002 | David et al. | |

| | | | |
|---|---|---|---|
| 6,729,428 B2 | 5/2004 | Jitsui | |
| 7,131,668 B2 | 11/2006 | Go | |
| 7,377,590 B2 | 5/2008 | Mattes et al. | |

(Continued)

FOREIGN PATENT DOCUMENTS

| | | |
|---|---|---|
| CN | 104627117 A | 5/2015 |
| CN | 207809116 U | 9/2018 |

(Continued)

OTHER PUBLICATIONS

Arbogast et al., "Injury risk to seat belt restrained occupants: effect
of age and seat row", Proceedings of the 22nd International Enhanced
Safety of Vehicles Conference. 2011.

(Continued)

*Primary Examiner* — Anthony D Barfield

(74) *Attorney, Agent, or Firm* — SHOOK, HARDY &
BACON L.L.P.

(57) ABSTRACT

Disclosed herein is an occupant safety restraint system that
dampens forces applied to an occupant by belts used for
restraining the occupant in the occupant safety restraint
system. Energy dampening structures may be disposed in
either a seat back portion of an occupant safety restraint
system or a seat bottom portion of an occupant safety
restraint system (or both) through which shoulder and/or hip
belts pass. The energy dampening structures may include
deformation members that deform when restraining belts
(i.e., shoulder and/or hip belts) contact the deformation
members during vehicle collisions or rapid deceleration or
acceleration. Deformation of the deformation members
reduces or dampens energy in the restraining belts applied to
occupants of the occupant safety restraint systems.

6 Claims, 11 Drawing Sheets

(56) References Cited

U.S. PATENT DOCUMENTS

| | | | |
|---|---|---|---|
| 7,401,859 B2 | 7/2008 | Kim et al. | |
| 7,472,952 B2 | 1/2009 | Nakhla et al. | |
| 7,607,697 B2 | 10/2009 | Esler et al. | |
| 7,735,919 B2 * | 6/2010 | Chen | B60R 22/26 |
| | | | 297/484 |
| 8,393,674 B2 | 3/2013 | Keegan et al. | |
| 8,496,095 B2 | 7/2013 | Ruthinowski et al. | |
| 8,496,293 B2 | 7/2013 | Gaudreau, Jr. | |
| 8,500,196 B2 | 8/2013 | Strong et al. | |
| 9,090,225 B2 | 7/2015 | Rouhana | |
| 9,714,002 B2 | 7/2017 | Cheng | |
| 2007/0138783 A1 * | 6/2007 | Gleason | B60R 22/24 |
| | | | 297/483 |
| 2007/0228802 A1 | 10/2007 | Nakhla | |
| 2008/0211287 A1 * | 9/2008 | Lamparter | B60R 22/023 |
| | | | 297/468 |
| 2008/0303325 A1 | 12/2008 | Scholz | |

FOREIGN PATENT DOCUMENTS

| | | |
|---|---|---|
| CN | 109715439 A | 5/2019 |
| DE | 19610917 A1 | 9/1997 |
| DE | 10107874 A1 | 9/2002 |
| EP | 2177395 A1 | 4/2010 |
| JP | 6411870 B2 | 10/2018 |
| WO | 2022/002062 A1 | 1/2022 |

OTHER PUBLICATIONS

Kee et al., "Impact Safety Prediction of Automotive Reinforcement Seat Belt Parts for 590 MPa Grade Materials by Using Computer Simulation", Journal of the Korean Society for Precision Engineering, vol. 39 (7). 2022. pp. 529-535.

Ma et al., Effectiveness of Booster Seats Compared With No Restraint or Seat Belt Alone for Crash Injury Prevention, Academic Emergency Medicine 20(9):880-7, Sep. 2013.

Maltese et al., "Effect of increased rear row occupancy on injury to seat belt restrained children in side impact crashes", Annual Proceedings/ Association for the Advancement of Automotive Medicine. vol. 49. Sep. 2005. pp. 229-243.

Rouhana et al., "Biomechanics of 4-point seat belt systems in frontal impacts", Stapp car crash journal, vol. 47, 2003. pp. 367-399.

* cited by examiner

OCCUPANT SAFETY RESTRAINT SYSTEM

TECHNICAL FIELD

Exemplary embodiments relate to occupant safety restraint systems such as child safety seats for use in an automobile or other similar vehicle.

BACKGROUND

Occupant safety restraint systems such as child safety seats are used for restraining a child or other small stature occupant in an automobile or similar vehicle. Use of such restraint systems are particularly useful in restraining a child or other small stature occupant whose attributes (e.g., age, height, weight) is/are below levels at which standard restraint systems (e.g., automobile seatbelt systems) will adequately restrain the occupant in the seat during a vehicle collision, rapid deceleration or rapid acceleration. Indeed, in many operating locations, laws are in place that require that any vehicle occupant whose age, height, weight, or combinations thereof is/are below threshold levels must be restrained in an approved occupant safety restraint system while riding in a vehicle.

A typical occupant safety restraint system includes a seat configured to support the occupant's back, shoulders, bottom and legs. Such occupant restraint systems typically include a safety belt system that straps across the occupant's shoulders and chest and across the occupant's hips and/or thighs. When the vehicle is involved in a collision or incurs rapid deceleration or acceleration, the occupant may be thrown or thrust against the safety belt system.

There is a need in the art for an occupant safety restraint system that dampens forces applied to an occupant by belts used for restraining the occupant in the occupant safety restraint system.

SUMMARY

Aspects of one or more exemplary embodiments provide an occupant safety restraint system that dampens forces applied to an occupant by belts used for restraining the occupant in the occupant safety restraint system. According to example embodiments, energy dampening structures may be disposed in either the seat back portion of an occupant safety restraint system or the seat bottom portion of an occupant safety restraint system (or both) through which shoulder and/or hip belts pass. Energy dampening structures in the seat back portion may be disposed in a shoulder rest or headrest portion of the seat back portion. According to particular examples, the energy dampening structures include deformation members that deform when restraining belts (i.e., shoulder and/or hip belts) contact the deformation members during vehicle collisions or rapid deceleration or acceleration. Deformation of the deformation members reduces or dampens energy in the restraining belts applied to occupants of the occupant safety restraint systems.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
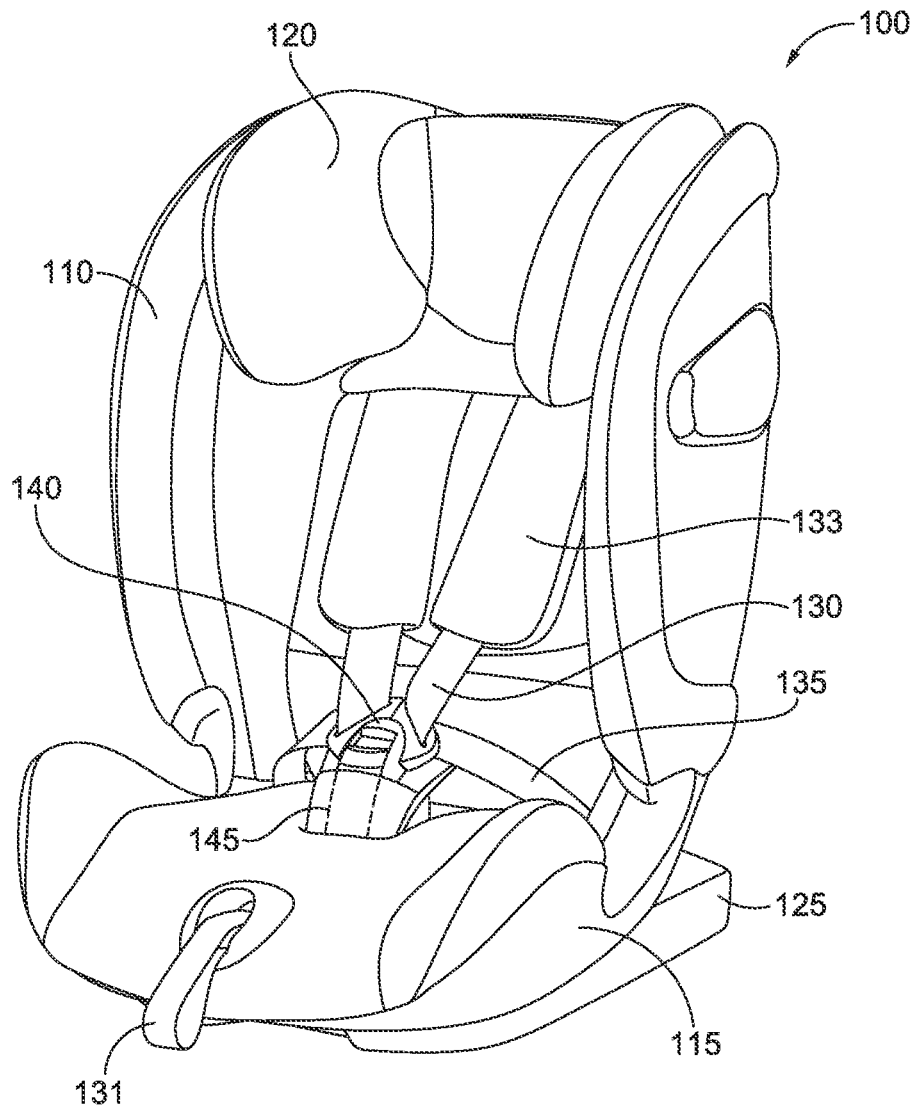
FIG. 1 is a perspective view illustrating an occupant safety restraint system, such as a child car seat, according to an embodiment.

Various modifications and different embodiments will be described below in detail with reference to the accompanying drawings so that those skilled in the art can carry out the disclosure. It should be understood, however, that the present disclosure is not intended to be limited to the specific embodiments, but the present disclosure includes modifications, equivalents or replacements that fall within the spirit and scope of the disclosure as defined in the following claims.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout various drawings and exemplary embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

According to an example embodiment, an occupant safety restraint system (hereinafter "car seat" for purposes of brevity) is provided that dampens forces applied to an occupant of the car seat when the system is used to restrain an occupant, particularly during vehicle collisions or other rapid acceleration or deceleration conditions. According to one example, a seat back structure of the car seat includes a pair of seat back energy dampening structures that include shoulder belt slots through which shoulder belts pass through the seat back structure and over the shoulders and chest of an occupant of the car seat. The seat back energy dampening structures may be disposed in a shoulder rest portion or in a headrest portion of the seat back structure, where the shoulder rest portion or the headrest portion may be stationary in a fixed position or may be adjustable upward or downward to accommodate varying heights of occupants. A seat back deformation member is disposed in each seat back energy dampening structure by which a shoulder belt passes during normal operation. When the car seat incurs rapid acceleration or deceleration during a vehicle collision or other rapid movement of the vehicle, contact of the shoulder belts with the seat back deformation members in the seat back energy dampening structures causes deformation of the deformation members, resulting in a dampening or reduction of forces and associated energy applied to the shoulders and chest of the occupant by the shoulder belts.

The seat back deformation member may include a structure under which a shoulder belt passes as the shoulder belt passes through the shoulder belt slot to a front side of the seat back and over the shoulders and chest of the seat occupant. The seat back deformation member may include a leading end projecting away from a trailing end that is connected to or integrally formed with the seat back energy dampening structure. According to embodiments, the leading end may project forward toward the front of the car seat, may project backward toward a rear or back of the car seat, and/or the seat back deformation member may extend downward or upward. When a force is applied to the seat back deformation member during a deceleration or acceleration of the car seat, contact of the shoulder belt with the seat back deformation member causes the leading end of the seat back deformation member to deform toward the trailing end of the seat back deformation member to absorb energy in the shoulder belt caused by tension in the belt across the deformation member. According to a particular example, deformation of the leading end of the seat back deformation member toward the trailing end of the seat back deformation member includes bending, curling or crushing the seat back deformation member back toward the trailing end of the seat back deformation member.

The seat back deformation member may include a deformation point or break point at each of first and second sides of the seat back deformation member that is configured to deform or break when a force is applied to the seat back deformation member by the shoulder belt. The deformation points or break points may be located and connected between first and second sides of the leading end of the seat back deformation member and the adjacent structures of the seat back energy dampening structures. Deformation or breaking of the deformation points or break points further enables a deformation of the seat back deformation member toward the trailing end of the seat back deformation member. The deformation points or break points also provide for deformation control. That is, according to examples of the present disclosure, the deformation break points can be used to control when (timing) and under what conditions the deformation member is deformed during a rapid acceleration, rapid deceleration or crash event.

A deformation resistance or dampening structure may be adapted to the seat back deformation member to resist deformation of the leading end of the seat back deformation member toward the trailing end of the seat back deformation member. The deformation resistance or dampening structure may include one or more control ribs extending outward from the seat back deformation member. These control ribs may extend along the inner or outer surface from above the trailing end of the deformation member to the leading end of the seat back deformation member. According to an alternative example, the deformation resistance or dampening structure may include a solid or hollow piece of material (e.g., a foam or plastic block, wedge or tube) disposed between the trailing end of the seat back deformation member and the leading end of the seat back deformation member for resisting or dampening a deformation of the leading end of the seat back deformation member toward the trailing end of the seat back deformation member. Inclusion and use of deformation resistance or dampening structures may be used for tuning or adjusting the amount of deformation and/or the timing of deformation of the seat back deformation member that is incurred for varying conditions, such as varying heights and weights of seat occupants.

According to another example embodiment, a seat bottom structure of the occupant safety restraint system includes a pair of seat bottom energy dampening structures through which seat belts pass through the seat bottom structure and over the hips or thighs of an occupant. A seat bottom deformation member is disposed in each seat bottom energy dampening structure, and a hip belt passes under the seat bottom deformation member during normal operation. When the car seat incurs rapid acceleration or deceleration during a vehicle collision or other rapid movement of the vehicle, contact of the hip belts with the seat bottom deformation members causes deformation of the seat bottom deformation members, resulting in a dampening or reduction of forces and associated energy applied to the hips or thighs of the occupant by the hip belts.

The seat bottom energy dampening structures may include first and second seat bottom belt slots disposed on opposite sides of the seat bottom deformation member. The seat bottom belts may be anchored above an upper surface of the seat bottom structure and may pass from the upper surface of the seat bottom through the first seat bottom belt slot, then below the downwardly extending seat bottom deformation member, and then up through the second seat bottom belt slot to the upper surface of the seat bottom structure and over the hips or thighs of the occupant. Alternatively, the seat bottom energy dampening structure may include a single seat bottom slot adjacent to the seat bottom deformation member. According to this alternative example, the seat bottom belt may be anchored under the bottom surface of the seat bottom structure and may pass below the downwardly extending seat bottom deformation member and then up through the single seat bottom belt slot to the upper surface of the seat bottom structure and over the hips or thighs of the occupant.

The downwardly extending seat bottom deformation member may include a curved surface under which the seat bottom belt passes. When a force is applied to the seat bottom deformation member by the seat bottom belt, the seat bottom deformation member deforms upward to dampen or reduce energy being applied to the hips or thighs of the occupant of the car seat. That is, as the seat bottom belt forcefully engages the seat bottom deformation member, the bottom of the seat bottom deformation member deforms or crushes upward to absorb some of the force and resulting energy delivered by the seat belt to the seat bottom deformation member.

The seat bottom deformation member may include a variety of deformable or energy absorbing materials or members configured to intentionally deform in the form of buckling, bending, crushing, shearing, twisting, other deformation, and/or combinations thereof during a rapid acceleration or deceleration during a vehicle collision or other rapid movement of the vehicle. For example, the seat bottom deformation member may include a spring or other suitable material disposed above a surface of the seat bottom deformation member that may absorb energy when the seat bottom belt applies force to the curved surface of the seat bottom deformation member. According to these examples, the spring or other suitable material may be chosen or tuned to resist or dampen deformation or movement of the surface to provide desired energy absorption.

According to an alternative example, the seat bottom deformation member may include an opening or slot in a bottom portion of the seat bottom deformation member that separates the seat bottom deformation member into two spaced-apart elements. When the force is applied to the two spaced-apart elements of the seat bottom deformation member by the seat bottom belt, the two spaced-apart elements are deformed together to close the opening between the two spaced-apart elements to absorb energy being applied to the seat bottom deformation member by the seatbelt. One or both of the two spaced-apart elements may include one or more deformation resistance or dampening structures (e.g., a control rib or material disposed along an inner surface of the spaced-apart elements) for dampening or resisting deformation of the two spaced-apart elements when a force is applied to the seat bottom deformation member in a similar manner as described with respect to some aspects of the seat back deformation member.

According to one embodiment, an occupant safety restraint system may be configured to include the seat back energy dampening structures only and not the seat bottom energy dampening structures. Alternatively, the occupant safety restraint system (i.e., car seat) may be configured to include the seat bottom energy dampening structures only and not the seat back energy dampening structures. According to yet another alternative, the occupant safety restraint system may be configured to include both the seat back energy dampening structures and the seat bottom energy dampening structures.

Hereinafter, an occupant safety restraint system according to exemplary embodiments will be described with reference to FIGS. 1-16. FIG. 1 is a perspective view illustrating an occupant safety restraint system (hereafter "car seat" for purposes of brevity), according to an embodiment. According to one aspect, the car seat 100 is in the form of a safety seat that may be secured inside an automobile or similar vehicle for holding and protecting a child or other small stature person against vehicle collisions, rapid deceleration and/or rapid acceleration. The car seat 100, illustrated in FIG. 1, is for purposes of illustration only and is not limiting of any number of variations in the design and configuration of occupant safety restraint systems that may be used for restraining and protecting a child or other small stature person, as described herein.

Referring still to FIG. 1, the example child car seat 100 includes a seat back soft goods or fabric covering 110 overlaying a seat back portion of the car seat 100. A soft goods or fabric seat covering 115 is illustrated as overlaying a seat bottom portion of the car seat 100. As should be appreciated, the soft goods or fabric coverings 110 and 115 may be configured as two separate coverings or may be configured as a single covering for overlaying an underlying car seat structure or shell described below with reference to FIG. 2.

A headrest covering 120 is illustrated over a head and shoulder portion of the car seat 100. As should be understood, the headrest covering 120 may be configured for covering an underlying stationary or adjustable head and shoulder (headrest) portion of a car seat shell described below with reference to FIG. 2. As should also be understood, the illustration and description of a stationary or adjustable head and shoulder structure is for purposes of illustration only, and it will be appreciated that a number of variations of the car seat 100 may be configured with or without a head and shoulder portion.

A harness assembly comprised of shoulder restraining belts 130 (also referred to as shoulder belts 130), hip/thigh restraining belts 135 (also referred to as hip belts 135), and a crotch belt 145 and a multi-point belt connector 140 is illustrated. According to an aspect, the shoulder belts 130 are secured to the underlying occupant safety restraint system shell, described below with reference to FIG. 2, and are provided for placing over the shoulders and chest of an occupant of the car seat 100. The hip belts 135 are similarly secured to a car seat shell, describe below with reference to FIG. 2, and are provided for placing over the hips and/or thighs of an occupant of the car seat 100. It should be understood that shoulder belts 130 may be integrally formed with hip belts 135 such that one portion of a single belt may form one shoulder belt 130 while another portion of the same belt may form a hip belt 135. That is, as illustrated in and described with respect to FIG. 2 below, the shoulder belt 130, the hip belt 135 and the crotch belt 145 may be parts of a single integrated belt webbing that is threaded through slots in the underlying occupant safety restraint system shell (FIG. 2) to provide belts for passing over the shoulders, hips and crotch of an occupant. Alternatively, one or more of these belts may act as an independent webbing.

Safety/comfort pads 133 are illustrated for encasing the shoulder belts 130 for providing comfort to the occupant secured in the car seat 100. Similar safety/comfort pads (not illustrated) may be included for the hip belts 135 and for the crotch belt 145.

The crotch belt 145 may extend upward from the seat bottom portion 310 of the car seat 100 and may be configured to extend between an occupant's legs. The multi-point belt connector 140 is illustrated for securing the shoulder belt 130, hip belts 135, and the crotch belt 145 together at a central point. The multi-point belt connector 140 is for purposes of illustration only and is not limiting of a variety of other systems that may be used for buckling or securing together the belts 130, 135, and/or 145 of the car seat 100. The crotch belt 145 may also be referred to as an adjustable belt as it may have an adjustable length and be used to adjust the fit of the combined shoulder and hip belt assembly according to the size of an occupant. That is, by pulling on the adjustable belt 145 illustrated passing through an orifice at the front of the seat bottom portion 310 of the car seat 100, tension may be applied to the multi-point belt connector 140 for tightening or loosening, as required, the combined shoulder and seatbelt assembly.

Referring still to FIG. 1, a car seat base 125 is illustrated for placing the car seat 100 onto the seating of a vehicle and for attaching the car seat 100 to the vehicle seating. As should be understood, a variety of configurations may be provided for attaching the car seat base 125 to the seating of a vehicle, including but not limited to, attaching the car seat base 125 to the vehicle seating by securing the car seat base 125 to the vehicle seating using seatbelts provided by the associated vehicle and/or other anchoring mechanisms. In some aspects, the car seat 100 may be rotatable and/or reclinable with respect to the car seat base 125. In other aspects, the car seat 100 may be stationary in a fixed position on the car seat base 125. Further, in other embodiments, the car seat 100 may be configured to be secured directly to the vehicle seating without a car seat base 125. According to examples, the car seat 100 may be positioned in a vehicle in a forward facing orientation or in a rearward facing orientation.

Figure 2:
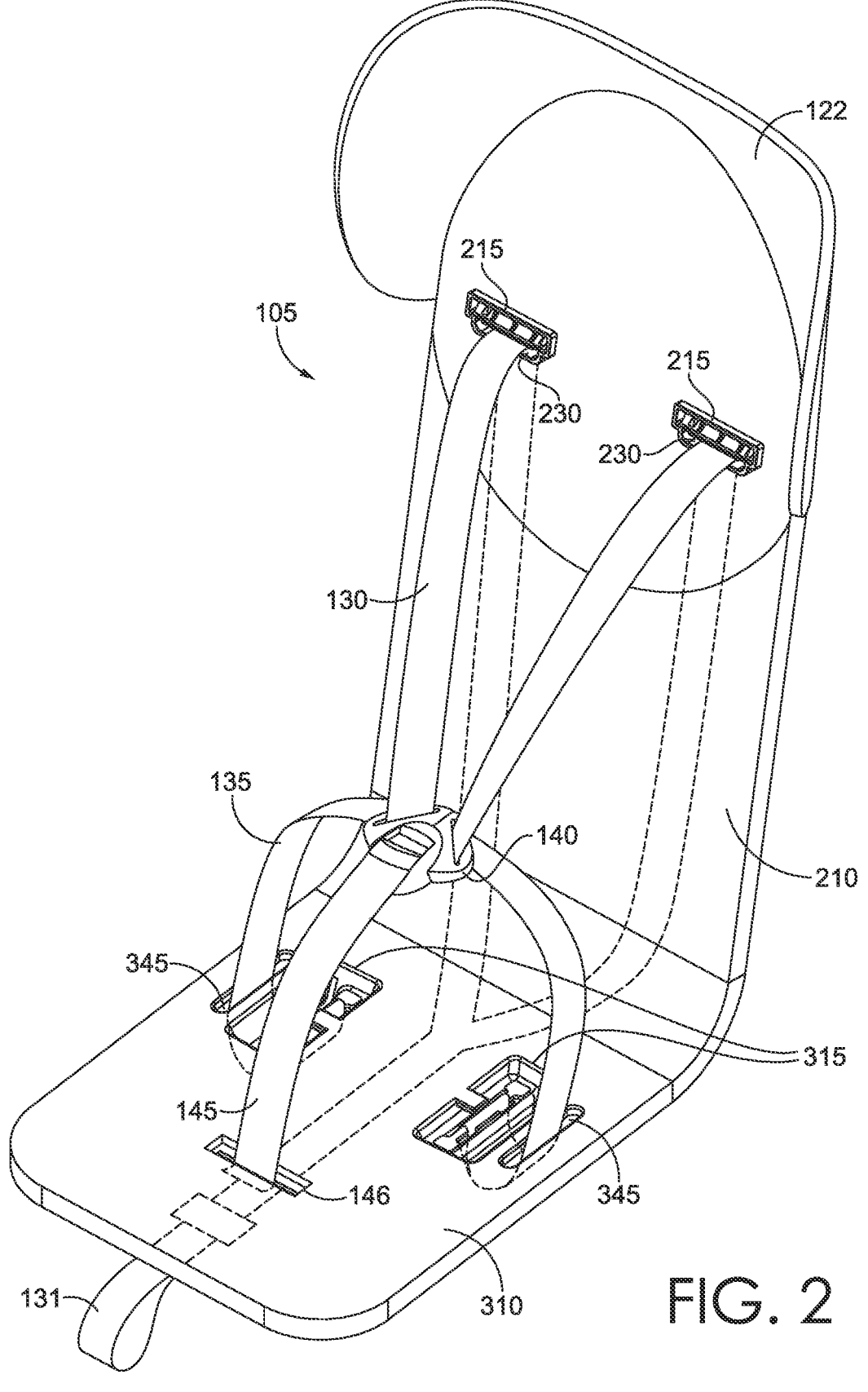
FIG. 2 is a perspective view illustrating a front side of an occupant restraint system structural shell, according to an embodiment.

FIG. 2 is a perspective view illustrating a front side of an occupant restraint system structural shell or frame, according to an embodiment. The occupant safety restraint system structural shell 105 (car seat shell 105 hereafter) serves as the underlying support structure for the car seat 100, illustrated and described with reference to FIG. 1. Any number of suitable materials may be used for the car seat shell 105. According to one example, a suitable material may include a variety of plastics. The car seat shell 105 includes a seat back portion 210 for providing support to the back, shoulders and head of an occupant of the car seat 100. A seat bottom portion 310 provides support for the bottom and legs of an occupant of the car seat 100. As illustrated in FIG. 2, the seat back portion 210 and the seat bottom portion 310 are components of an integrated car seat shell 105 that may be covered by soft goods or fabric seat back covering 110, soft goods or fabric seat bottom covering 115 and soft goods or fabric headrest covering 120, as described above with reference to FIG. 1, for providing a comfortable and supportive seat back and seat bottom for an occupant of the car seat 100. The car seat shell 105 may include additional structural components not illustrated in FIG. 2 for purposes of this discussion.

Referring still to FIG. 2, the seat back portion 210 may include a stationary or adjustable head and shoulder (headrest) component 122 that may be utilized as a head and shoulder support of the car seat 100. As described above with reference to FIG. 1, inclusion of the stationary or adjustable head and shoulder component 122 is for purposes of illustration only and is not limiting of a variety of car seat 100 configurations that may or may not include a stationary or adjustable head and shoulder support component. According to one embodiment, the seat back energy dampening structures 215 described in detail below may be disposed in the head and shoulder component 122 (i.e., headrest) of the seat back portion 210. Accordingly, by adjusting the head and shoulder component 122 upward or downward, resulting headrest and/or shoulder rest portions of the seat back portion 210 are provided at different positions to accommodate different heights of occupants of the car seat 100.

Referring still to FIG. 2, a pair of spaced-apart seat back energy dampening structures 215 are provided in the seat back portion 210. The seat back energy dampening structures 215 each provides a slot 230 through which a shoulder belt 130 may pass for securing the shoulders and chest of an occupant in the car seat 100, as described above with reference to FIG. 1. The seat back energy dampening structures 215 (described in detail below with reference to FIGS. 4-8) are configured for dampening energy applied to an occupant's shoulders and chest by the shoulder belts 130 during a vehicle collision, deceleration or acceleration.

The seat back energy dampening structures 215 may be positioned at various levels in the seat back portion 210. For example, the seat back energy dampening structures 215 may be disposed in a lower portion of the seat back portion 210, in a middle portion of the seat back portion 210 or in an upper portion of the seat back portion 210. If the car seat 100 is equipped with a stationary or adjustable head and shoulder component 122, as illustrated in FIG. 2, the seat back energy dampening structures 215 may be disposed in the stationary or adjustable head and shoulder rest component 122 so that the shoulder belts 130 pass through a headrest or shoulder rest of the car seat 100.

In addition, while the seat back energy dampening structures 215 are illustrated as a pair of spaced-apart structures, according to an alternative example, the seat back portion 210 may include additional seat back energy dampening structures 215 disposed above and/or below the seat back energy dampening structure 215, illustrated in FIG. 2, in a ladder formation comprising one or more additional rows of spaced-apart seat back energy dampening structures 215. According to examples, the one or more additional rows of spaced-apart seat back energy dampening structures 215 may extend vertically along the seat back portion 210 from a lower portion of the seat back portion 210 to an upper portion of the seat back portion 210, including in the head and shoulder component 122. According to this example embodiment, the position at which the shoulder belts 130 pass through the occupant safety restraint shell 105 and car seat 100 may be changed to accommodate different heights of occupants of the car seat 100 by threading the shoulder belts 130 through different seat back energy dampening structures 215 at different heights along the seat back portion 210, including along different heights of the head and shoulder component 122. Referring still to FIG. 2, the seat bottom portion 310 includes a pair of spaced-apart seat bottom energy dampening structures 315 through which hip belts 135 pass through slots 345 for securing the hips and/or thighs of an occupant of the car seat 100. The seat bottom energy dampening structures 315 (described in detail below with reference to FIGS. 9-13) are configured for dampening energy applied to an occupant's hips or thighs during a vehicle collision, deceleration or acceleration.

As illustrated in FIG. 2, the shoulder belts 130, the hip belts 135 and the crotch belt 145 may be components of one or more integrated belt webbings. The configuration illustrated in FIG. 2 (see also FIG. 3) shows the shoulder belt 130 threaded through the seat back energy dampening structures 215 and then attached to the multi-point belt connector 140. The shoulder belts 130 run along a back side of the car seat 100 (and shell 105). According to one example embodiment, the two shoulder belts 130 merge into a single belt 131 that passes under the seat bottom portion 310 and out beyond a front edge of the seat bottom portion 310 where it may be used to adjust the length and/or tension of the shoulder belts 130. The crotch belt 145, illustrated in FIG. 2, may be secured to the seat bottom portion 310 by passing the crotch belt 145 through a crotch belt connection slot 146 and may then be secured to the bottom of the seat bottom portion 310. The crotch belt 145 may pass between the legs of an occupant of the car seat 100 and then may be secured to the multi-point connector 140. The hip belts 135 are shown as a separate belt connected to the seat bottom portion 310 and to the multi-point connector 140.

Figure 3:
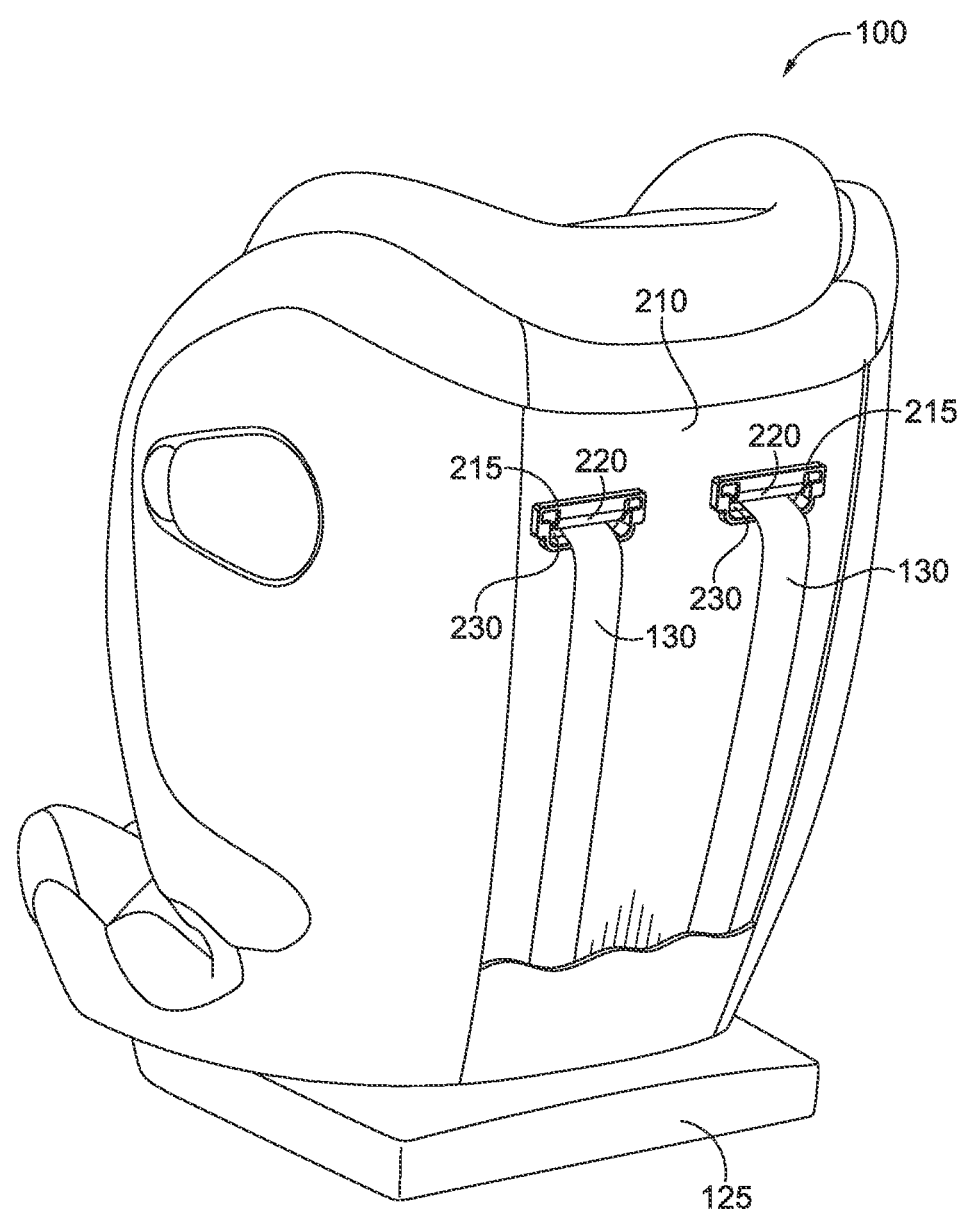
FIG. 3 is a perspective view of a back side of a seat back portion of the occupant safety restraint system of FIG. 1, according to an embodiment.

As should be appreciated, the configurations of the belts 130, 135 and 145 illustrated in FIGS. 1-3 are for purposes of example only and are not limiting of the various belt configurations that may be used according to examples of this disclosure. For example, the seat back energy dampening structures 215 illustrated in FIGS. 1-3 are configured as part of a pair of spaced-apart seat back energy dampening structures 215. According to an alternate configuration, a single seat back energy dampening structure 215 may be provided through which a single shoulder belt 130 may be passed through to the front of the car seat 100 which then splits into two shoulder belts 130 for passing over each of the shoulders of an occupant of the car seat 100. In another alternative, a single shoulder belt 130 may be passed through a single seat back energy dampening structure 215 to extend diagonally across a shoulder and chest of the occupant, similar to a vehicle seat belt. In these alternative configurations, the single seat back energy dampening structure 215 may include similar structures described herein and function in a similar manner.

Referring now to FIGS. 3-8, the components and configurations of the seat back energy dampening structures 215 are illustrated and described. FIG. 3 is a perspective view of a back side of the seat back portion 210 of the car seat 100 of FIG. 1. The spaced-apart seat back energy dampening structures 215 each include a seat back deformation member 220, described further herein. As shoulder belts 130 pass through slots 230 of seat back energy dampening structures 215, the shoulder belts 130 pass under the seat back deformation members 220 to extend through the back surface of the car seat 100 to the front of the car seat 100 and over the shoulders and chest of an occupant, as described above with reference to FIG. 1.

Figures 4, 5:
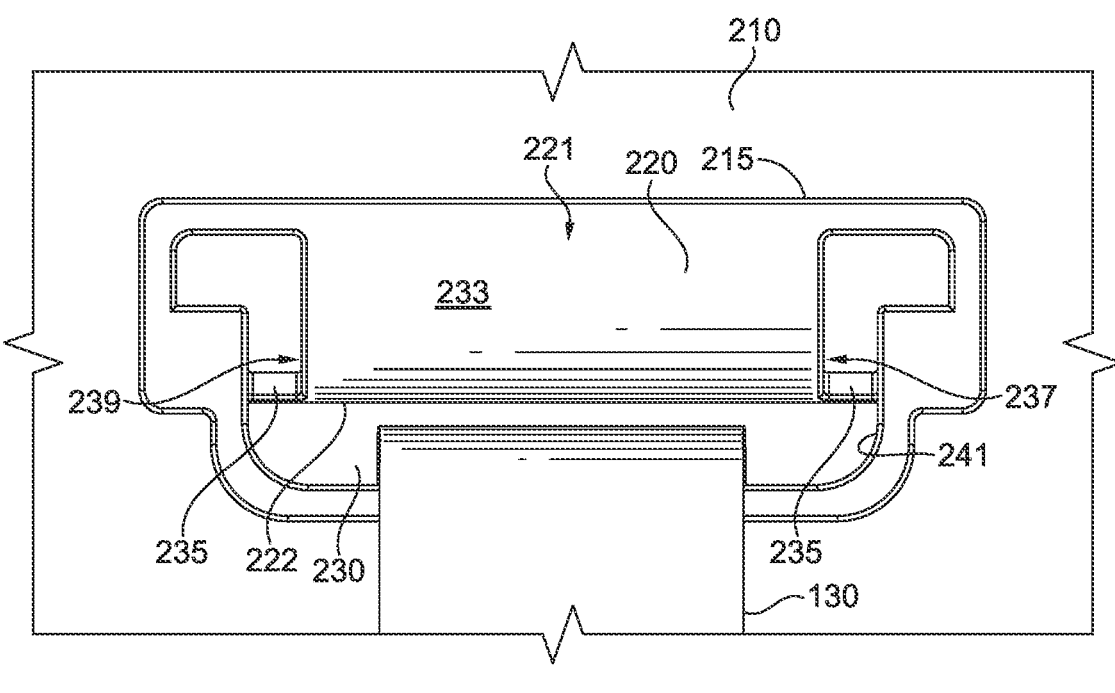
FIG. 4 illustrates a back view of a seat back energy dampening structure, according to an embodiment.
FIG. 5 illustrates a front view of the seat back energy dampening structure of FIG. 4, according to an embodiment.

FIGS. 4 and 5 illustrate a back view and a perspective front view, respectively, of a seat back energy dampening structure 215 disposed in the back of the seat back portion 210 or head and shoulder component 122 of the car seat 100, as illustrated and described above with reference to FIGS. 1-3. The seat back energy dampening structures 215 are configured to distribute the shoulder belts 130, via the belt slots 230 of the seat back energy dampening structures 215 from a backside of the car seat 100 through to a front side of the car seat 100 for placing the shoulder belts 130 over the shoulders and chest of an occupant of the car seat 100.

Referring still to FIGS. 4 and 5, the seat back deformation member 220 is arranged within the seat back energy dampening structure 215 such that the seat back deformation member 220 at least partially forms a ceiling or top side of the slot 230 through which the shoulder belt 130 passes as it extends between the front side and back side of the seat back portion 210, as illustrated in FIG. 1. In example aspects, the seat back deformation member 220 has one end secured to a top portion of the seat back energy dampening structure 215 and extends downward. The end of the seat back deformation member 220 secured to the top portion of the seat back energy dampening structure 215 may be referred to as a trailing end 221 of the seat back deformation member 220, and the opposite end of the seat back deformation member 220 may be referred to as a leading end 240. While all or a majority of the width of the trailing end 221 may be integrated with or secured to the rest of the seat back portion 210, at least part of the leading end 240 may form a free, or unattached, edge of the seat back deformation member 220.

The seat back deformation member 220 may have a surface 222 between the trailing end 221 and the leading end 240 of the seat back deformation member 220. In some exemplary aspects, the seat back deformation member 220 curves in towards the front side of the seat back portion 210. As such, the seat back deformation member 220 may include a concave inner surface 231 on a front side and a convex outer surface 233 on a back side. However, according to alternative embodiments, the surface 222 of the seat back deformation member may be shaped other than a curved surface. That is, any number of surface 222 shapes may be utilized to allow the shoulder belts 130 to pass by the surface 222 and to engage and deform the surface 222 by contact of the shoulder belts 130 with the surface 222 during a rapid acceleration, deceleration or crash event.

As the shoulder belt 130 extends through the slot 230, the shoulder belt 130 is positioned under the curved body 222—specifically, the convex outer surface 233—and as the shoulder belt 130 applies an upward force (for example, during a crash event, acceleration, or deceleration), the curved body 222 of the seat back deformation member 220 bends further so that the leading end 240 is moved closer to the trailing end 221 and in some aspects may break. At least some of the force applied by the shoulder belt 130 is absorbed through the process of bending, and in some cases breaking, the curved body 222 of the seat back deformation member 220.

The seat back deformation member 220 may be formed with a material having some resiliency such that when a lower amount of force is applied, the seat back deformation member 220 bends slightly and can automatically return to a resting state once the force is removed. When a sufficient amount of force is applied, however, the seat back deformation member 220 may bend to a degree that it cannot automatically return to a resting state even when the force is removed. In other aspects, the seat back deformation member 220 is made from a sufficiently rigid material that it does not bend until a force satisfying a pre-determined threshold is applied and once such a force is applied, the seat back deformation member 220 cannot be returned to its resting state.

In some aspects, the seat back deformation member 220 includes one or more deformation points or break points 235 (referred to herein as break points 235) as illustrated in FIGS. 4 and 5. The pair of break points 235 may provide an additional point at which the seat back deformation member 220 deforms or breaks, which may absorbed additional energy. As illustrated in FIGS. 4 and 5, the break points 235 are structures connecting the seat back deformation member 220 to the adjacent structures of the seat back energy dampening structures 215 and are configured to deform or break upon application of a sufficient force to the seat back deformation member 220. According to one embodiment, the break points 235 may also be used to control the timing and conditions of deformation of the deformation member 220. That is, use of the break points 235 may resist forces applied to the seat back deformation member 220 such that a requisite amount of force is required to break or deform the break points 235 which, in turns, allows for control of the timing of the deformation of the seat back deformation member 220 until the break points 235 either break or are deformed. Thus, use of the break points 235 allows for tuning the deformation member 220 to deform according to desired timing and applied forces.

In some aspects, the seat back deformation member 220 includes a first side 237 and an opposite second side 239 (which may correspond to left and right sides), and the break points 235 connect the first side 237 and the second side 239 with a side wall 241 of the seat back energy dampening structure 215 that partially defines the slot 230. In addition to being connected to the first and second sides 237 and 239 of the seat back deformation member 220, the break points 235 may connect the leading end 240 of the seat back deformation member 220. As such, during deformation forces against the leading end 240 by the shoulder belt 130, described in detail below with reference to FIG. 8, the break points 235 may bend, deform or break to further enable the leading end 240 to deform up and back toward the trailing end 221.

Figure 6:
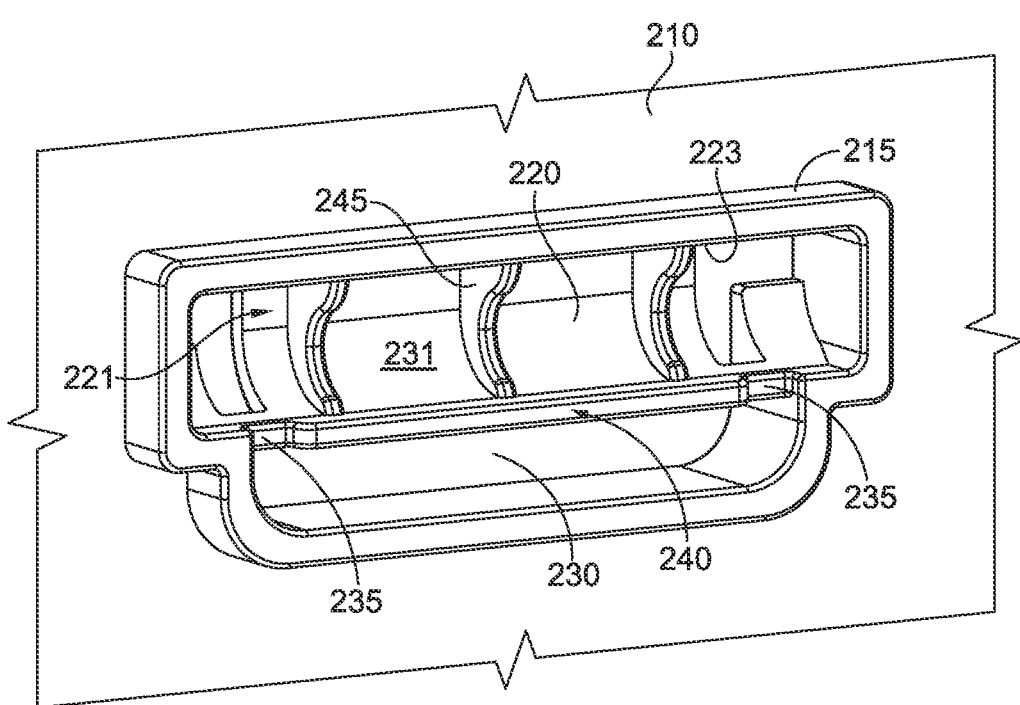
FIG. 6 illustrates a perspective front view of the seat back energy dampening structure of FIG. 5 and illustrates a plurality of deformation dampening ribs, according to embodiment.

In some aspects, the break points 235 are thinner (e.g., between front and back sides) than the seat back deformation member 220. The thinner structure of the break points 235 relative to the seat back deformation member 220 causes the structure to break at the specified break points to allow the curved body 222 to bend, rather than a break occurring at any point along the seat back deformation member 220. Although FIGS. 4-6 illustrate a pair of break points 235 on the first and second sides 237 and 239, it should be understood that, in other embodiments, the seat back energy dampening structure 215 may include a single break point 235 on one of the sides 237 or 239. Further embodiments of the seat back energy dampening structure 215 may not include any break points 235.

FIG. 6 illustrates a perspective front view of the seat back energy dampening structure 215 having a plurality of deformation dampening structures 245. One or more seat back deformation member dampening structures 245 may be disposed on the inner surface 231 of the curved seat back deformation member 220 for dampening or resisting the ability of the leading end 240 to deform, bend or crush in the direction of the trailing end 221. As illustrated in FIG. 6, the seat back deformation member dampening structures 245 are illustrated as one or more ribs extending longitudinally from the trailing end 221 to the leading end 240 of the seat back deformation member 220. Further, in some aspects, each rib may extend down from a surface 223 above the seat back deformation member 220 and along the inner surface 231 of the curved body 222 to the leading end 240.

The deformation dampening structures 245 may be formed in a variety of shapes and/or may be made from a number of suitable materials; for example, the deformation dampening structures 245 may be made from the same material as the car seat shell 105, or other materials such as a variety of foam materials may be used. The profile or shape of the seat back deformation member dampening structures 245 may be varied to adjust the amount of resistance or dampening of the deformation of the leading end 240 when forces are applied to the seat back deformation member 220. Moreover, as should be appreciated, the quantity, spacing, thickness, length, and/or material of the seat back deformation member dampening structures 245 may vary to tune the amount of resistance or dampening of the deformation of the leading end 240 of the seat back deformation member 220 when forces are applied to the body 222 or the leading end 240 of the seat back deformation member 220 by the shoulder belt 130. As should be appreciated, resistance against the deformation of the leading end 240 of the seat back deformation member 220 may be required for adjusting the energy dampening of the seat back energy dampening structure 215 for different degrees of deformation.

Figure 7:
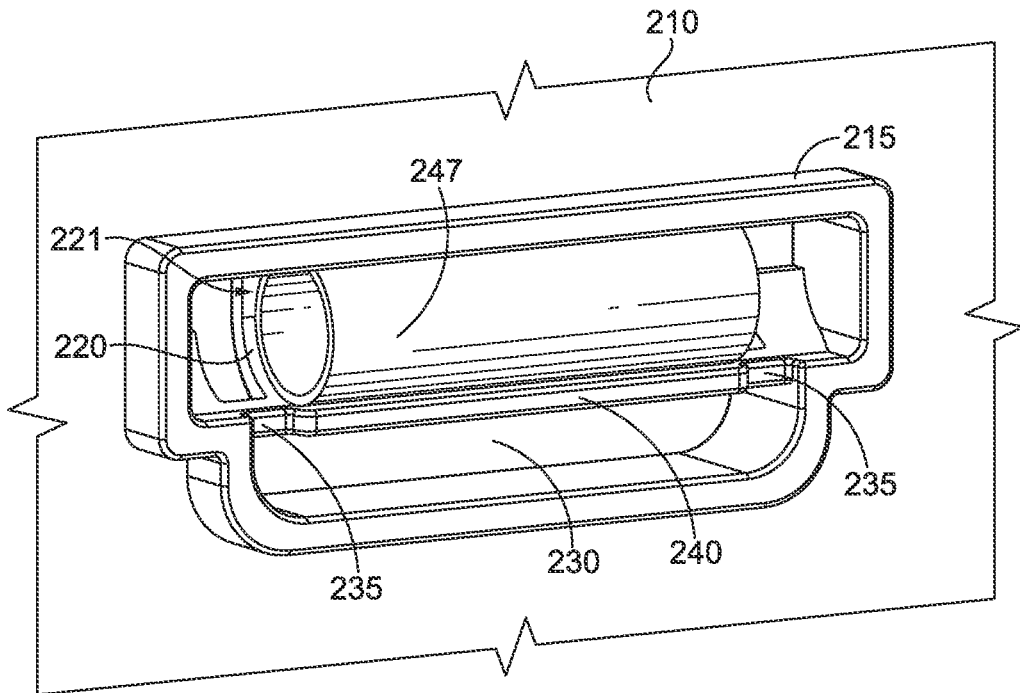
FIG. 7 illustrates a perspective front view of the seat back energy dampening structure of FIG. 5 and illustrates an alternative deformation dampening structure, according to an embodiment.

FIG. 7 illustrates a perspective front view of the seat back energy dampening structure 215 of FIG. 5 showing an alternative deformation dampening structure 247 for dampening or resisting deformation of the seat back deformation member 220. In FIG. 7, alternative deformation dampening structure 247 is illustrated as having a tube-shaped structure, but as should be understood, any suitable structure may be used such as, for example, a solid tube-shaped structure, a wedge-shaped structure, a rectangular-shaped structure, and the like. The alternative deformation dampening structure 247 may extend from the trailing end 221 to the leading end 240 of the seat back deformation member 220 to provide resistance again deformation of the leading end 240 towards the trailing end 221 in a similar manner as described with respect to the deformation dampening structures 245 of FIG. 6. In addition, the deformation dampening structure 247 may be made from a number of suitable materials; for example, the deformation dampening structure may be made from the same material as the car seat shell 105, or other materials such as a variety of foam materials may be used. It will be appreciated that some embodiments of the seat back energy dampening structure 215 may not utilize any deformation dampening structures.

Figure 8:
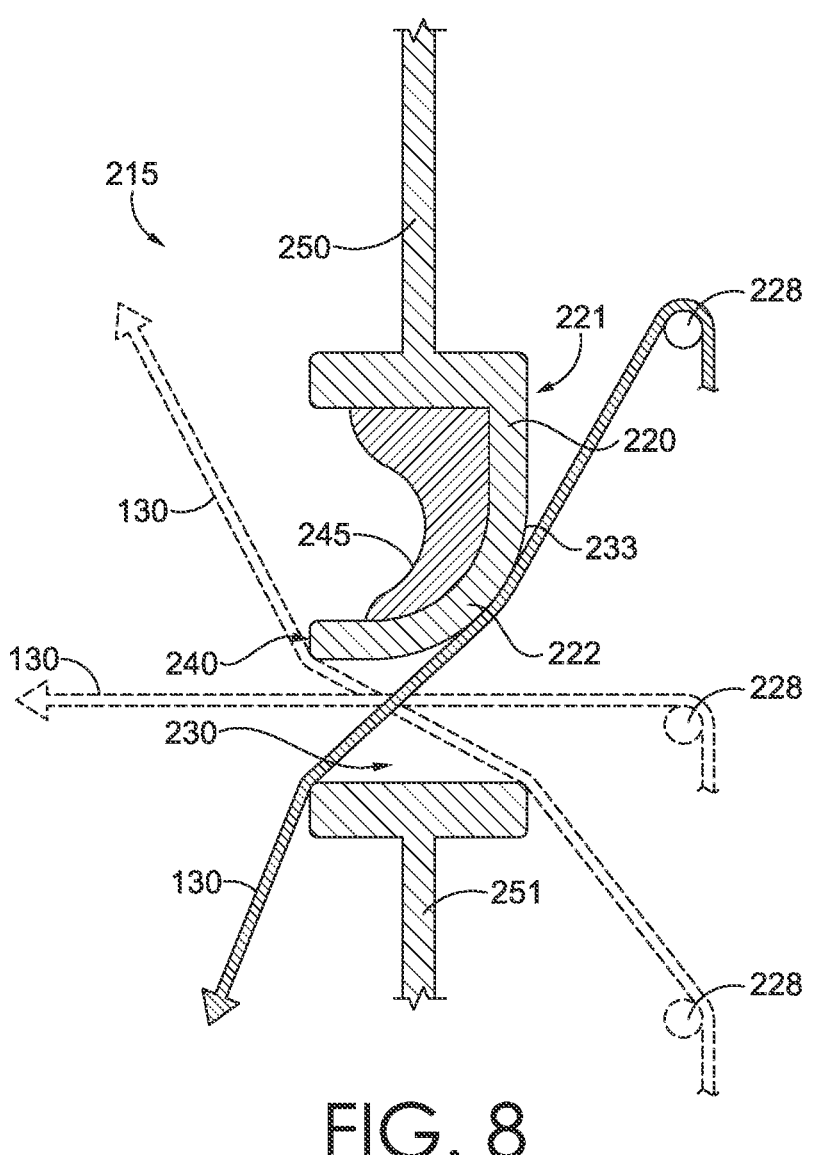
FIG. 8 is a cross-sectional view of a seat back energy dampening structure, according to an embodiment.

FIG. 8 is a cross-sectional view of a seat back energy dampening structure 215 as described herein. An upper section 250 of the seat back energy dampening structure 215 includes the seat back deformation member 220 having a trailing end 221 and a leading end 240. A deformation dampening structure 245 is illustrated along the inner surface 231 of the seat back deformation member 220 for resisting or dampening deformation of the deformation member 220. The shoulder belt 130 is illustrated as passing through the belt slot 230 under the seat back deformation member 220 above a lower section 251 of the seat back energy dampening structure 215.

Referring back to FIGS. 2 and 3 and referring still to FIG. 8, the seat back deformation member 220 is illustrated facing forward toward a front side of the seat back portion 210 and from above such that the shoulder belts 130 pass below the seat back deformation member 220. As should be appreciated, the seat back deformation member 220 may face rearward toward a back side of the seat back portion 210. Likewise, the vertical orientation of the seatback deformation member may be reversed such that the upper section 250 of seat back deformation member 220 rises from below and such that the shoulder belt 130 passes above the seat back deformation member 220. Alternatively, the seat back energy dampening structure 215 may include two sections 250 and two seat back deformation members 220 (one extending from above and a second extending from below) where the shoulder belt 130 passes between two seat back deformation members 220 and engage one or the other depending on a vertical positioning of the seat back energy dampening structure 215 in the seat back portion 210.

As illustrated in FIG. 8, the shoulder belt 130 may pass by the surface 222 of the seat back deformation member 220 according to one or more angles depending on the vertical positioning of the seat back energy dampening structure 215 in the seat back portion 210. According to example embodiments, the seat back energy dampening structure 215 may be positioned at different heights to accommodate different heights/sizes of car seat occupants, or the positioning of the seat back energy dampening structure 215 may change by raising or lowering a headrest portion of the seat back 210 in which the seat back energy dampening structures 215 are disposed.

As illustrated in FIG. 8, depending on the vertical positioning of the seat back energy dampening structure 215, the shoulder belt 130 may pass over a diverter rod 228 before passing through the belt slot 230. If the seat back energy dampening structure 215 is positioned above the diverter slot 228, the shoulder belt 130 may contact a forward edge 240 of the seat back deformation member 220. If the seat back energy dampening structure 215 is positioned approximately level with the diverter rod 228, the shoulder belt 130 may pass approximately horizontally under the surface 222 of the seat back deformation member 220. And, if the seat back energy dampening structure 215 is positioned beneath the diverter rod 228, the shoulder belt 130 may pass more along the surface 222 of the seat back deformation member 220. As should be appreciated, the three orientations of the seat back energy dampening structure 215 and the shoulder belts 130 illustrated in FIG. 8 are for purposes of example only and are not limiting of a number of different positions the seat back energy dampening structure 215 may be placed in according to embodiments of the present disclosure.

According to embodiments, during a vehicle collision, rapid deceleration, rapid acceleration or any movement of the car seat 100 causing sufficient tension in the shoulder belts 130 (for example, where an occupant of the car seat 100 is thrown or thrust upward, forward, or upward and forward), the shoulder belt 130 passing under the seat back deformation member 220 pulls up against the seat back deformation member 220, causing the leading end 240 of the seat back deformation member 220 to curl, bend, crush, or the like upward and backward in the direction of the trailing end 221. As should be appreciated, if the seat back energy dampening structure 215 is positioned to face rearward or a one or more different vertical positions, as described above, the seat back deformation member 220 may be deformed differently based on an angle of engagement of the shoulder belt 130 with the seat back deformation member 220. The contact of the shoulder belt 130 with the seat back deformation member 220 may be with the curved outer surface 233 of the seat back deformation member 220 or also may be with an edge of the seat back deformation member 220 that defines the leading end 240. In either case, contact of the shoulder belt 130 with the seat back deformation member 220 with sufficient tension causes a deformation of the deformation member 220. The deformation of the leading end 240 of the seat back deformation member 220 reduces or dampens energy in the shoulder belt 130 that may be applied to the occupant of the car seat 100.

According to one aspect, the break points 235 (FIGS. 5-8) may deform or break when the shoulder belt 130 applies forces against the leading end 240 of the seat back deformation member 220, which further enables the leading end 240 of the seat back deformation member 220 to deform, bend or crush back toward the trailing end 221 of the seat back deformation member 220 to further dampen or reduce energy in the shoulder belt 130 during a collision, rapid deceleration or rapid acceleration. If the seat back deformation member 220 is equipped with a deformation dampening structure 245, 247, deformation of the leading end may be resisted or dampened, which causes more of the energy to be absorbed for deformation of the deformation member 220 and, therefore, less energy to be transferred to the occupant of the car seat 100.

Referring back to FIGS. 1 and 2, as described above, hip belts 135 are configured for passing over and securing the hips and/or thighs of an occupant of the car seat 100. According to aspects of the present disclosure, the hip belts 135 are secured to the car seat shell 105 and are distributed through to an upper surface of the seat bottom portion 310 through a pair of spaced-apart seat bottom energy dampening structures 315.

Figure 9:
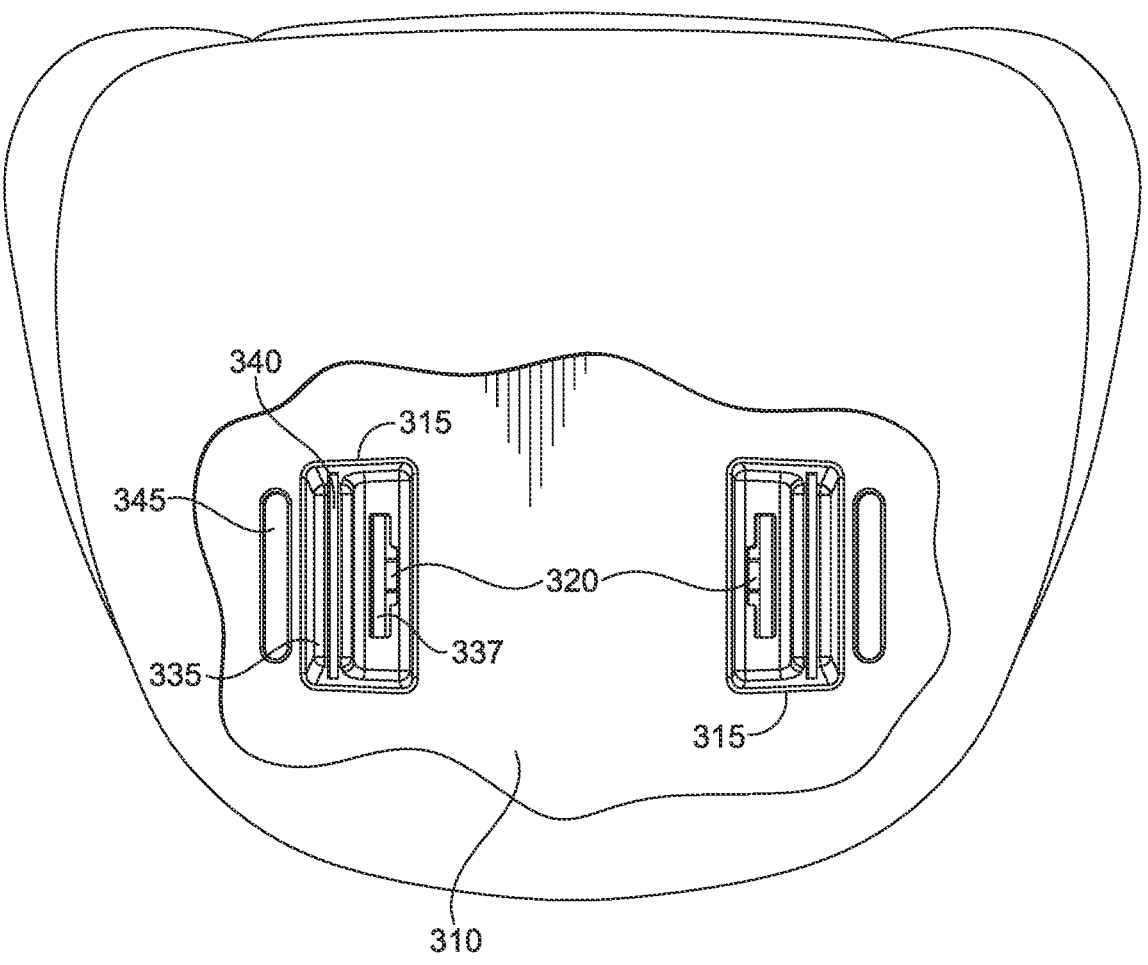
FIG. 9 illustrates is a bottom view of a seat bottom portion of the occupant safety restraint system of FIG. 1, according to an embodiment.
Figure 10:
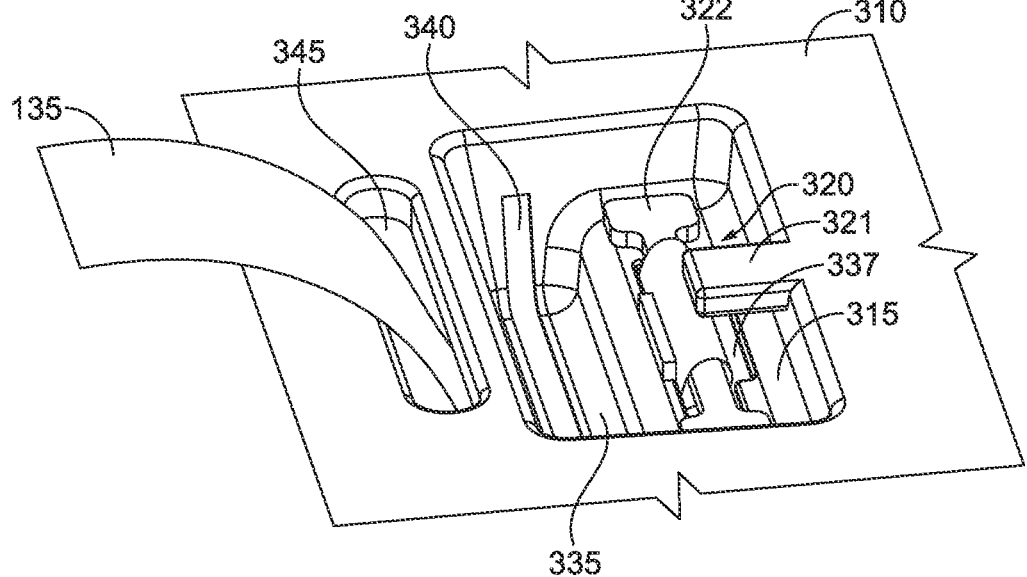
FIG. 10 illustrates a perspective upper surface view of a seat bottom energy dampening structure, according to an embodiment.

FIG. 9 illustrates a bottom view of the seat bottom portion 310 showing a pair of spaced-apart seat bottom energy dampening structures 315 according to aspects of the present disclosure. In some aspects, an exterior structure of the seat bottom portion 310 may be blocking visibility of the seat bottom energy dampening structures 315, and a portion of such structure is cut away in FIG. 9 so that the seat bottom energy dampening structures 315 may be visible. FIG. 10 illustrates a perspective top view of a seat bottom energy dampening structure 315.

As illustrated in FIGS. 9 and 10, each of the seat bottom energy dampening structures 315 include a hip belt anchor point 320 (which may also be referred to herein as an anchor position) for anchoring a hip belt 135 to the seat bottom portion 310. In the example illustrated, the hip belt anchor point 320 includes a hip belt anchor rod 322 around which the hip belt 135 is secured above a belt slot 337. The hip belt anchor rod 322 is longer than the belt slot 337 such that a portion of the hip belt 135 may extend through the belt slot 337 while at least part of the hip belt 135 that is secured to the hip belt anchor rod 322 remains above the belt slot 337. Some examples of the hip belt anchor point 320 further include a protrusion 321 disposed above the hip belt anchor rod 322 to help maintain the position of the hip belt anchor rod 322 and, thus, the hip belt 135. It will be appreciated that other structures and mechanisms may be used to anchor the hip belt 135 to the seat bottom portion 310, including where the hip belt 135 is anchored to a bottom or interior surface of the seat bottom portion 310, as described further with respect to FIG. 13.

A seat bottom deformation member 335 is illustrated adjacent to the hip belt anchor point 320. In the illustrated example, the hip belt 135 passes from an upper surface of the seat bottom portion 310 through the belt slot 337. A return belt slot 345 is also disposed adjacent the seat bottom deformation member 335 but opposite the belt slot 337 and allows the hip belt 135 to pass through to the upper surface of the seat bottom portion 310 and over the hips and/or thighs of the occupant of the car seat 100 as described above with reference to FIG. 1.

Between the hip belt anchor point 320 and the return belt slot 345 position, a seat bottom deformation member 335 is disposed. The seat bottom deformation member 335, illustrated in FIGS. 10-16, is shown projecting downward away from the upper surface of the seat bottom portion 310 to allow the hip belt 135 to pass under the downwardly projecting seat bottom deformation member 335 as it passes between the hip belt anchor point 320 and the return belt slot 345. According to an alternative embodiment, the seat bottom deformation member 335 may be positioned such that it projects upward and such that the hip belt 135 passes over the seat bottom deformation member 335. The seat bottom deformation member 335 may have one or more surfaces around which the hip belt 135 passes and applies forces during a crash event, acceleration or deceleration as described further with respect to FIGS. 11-16. After passing the seat bottom deformation member 335 and through the return belt slot 345, the hip belt 135 may pass over the hips and/or thighs of the car seat occupant.

Figure 11:
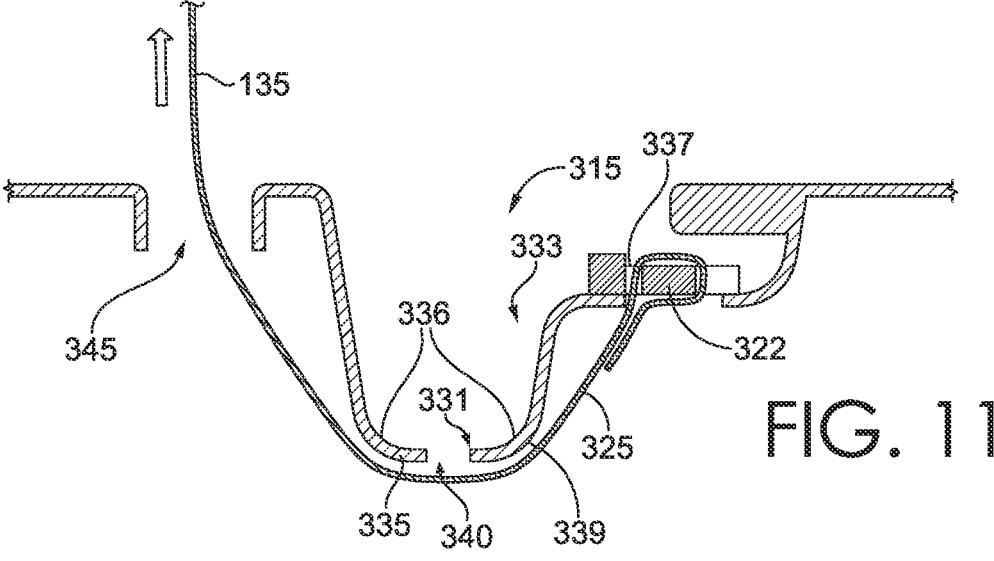
FIG. 11 illustrates a cross-sectional view of a seat bottom energy dampening structure, according to an embodiment.

FIG. 11 illustrates a cross-sectional view of the seat bottom energy dampening structure 315. According to this configuration, the hip belt 135 is anchored above a surface of the seat bottom portion 310 by the anchor rod 322 (see also FIG. 10). The anchored hip belt 135 passes downward through the belt slot 337 and then passes under the bottom or lower end of the seat bottom deformation member 335 before passing through the return belt slot 345 to an upper surface of the seat bottom portion 310 and over the hips or thighs of an occupant of the car seat 100.

According to this example illustrated in FIG. 11, the seat bottom deformation member 335 is configured with a seat bottom deformation member opening or gap 340 disposed in the bottom or lower end of the seat bottom deformation member 335. The seat bottom deformation member opening 340 splits the seat bottom deformation member 335 into two spaced-apart elements 336. Each of the spaced-apart elements 336 include a leading end 331 adjacent the seat bottom deformation member opening 340 and a trailing end 333 opposite the leading end 331 and secured to the rest of the seat bottom portion 310. Each spaced-apart elements 336 have a body 339 between the leading end 331 and the trailing end 333.

Figure 12:
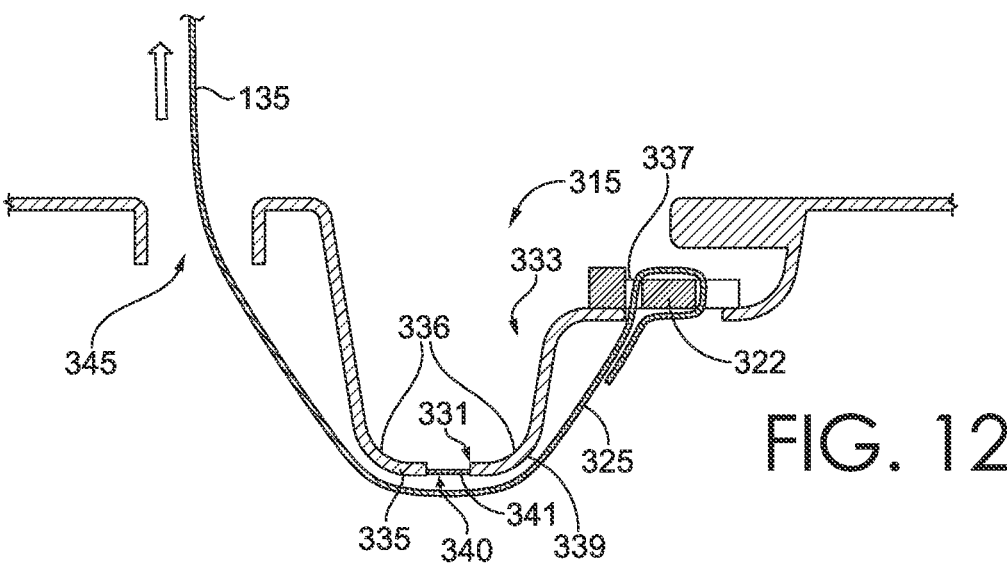
FIG. 12 illustrates a cross-sectional view of a seat bottom energy dampening structure, according to an embodiment.

Referring now to FIG. 12, according to an alternate embodiment, one or more deformation dampening or resistance structures 341 may be disposed across the gap 340 for dampening or resisting deformation of the two space-apart elements 336. As should be appreciated, the material and shape/length/thickness of the deformation dampening or resistance structures 341 may be varied to tune or adjust the timing of deformation and the amount of forces required to cause deformation of the seat bottom deformation member 335. According to this embodiment, the deformation dampening or resistance structures 341 operate in a similar manner as the break points 235 illustrated and described above with reference to FIGS. 4, 5 in that the deformation dampening or resistance structures 341 may resist forces applied to the seat bottom deformation member 335 such that a requisite amount of force is required to break or deform the deformation dampening or resistance structures 341 which, in turns, allows for control of the timing of the deformation of the seat bottom deformation member 335.

When the car seat 100 incurs forces caused during a collision, rapid deceleration or acceleration, tension in the hip belt 135 and contact of the hip belt 135 with the bottom or lower end of the seat bottom deformation member 335 causes the two spaced-apart elements 336 of the seat bottom deformation member 335 to squeeze inward to reduce or close the seat bottom deformation member opening 340. This may also cause two spaced-apart elements 336 to deform or crush upward so that the leading ends 331 are forced upwards towards the respective trailing ends 333. Squeezing the two spaced-apart elements 336 and deforming or crushing the two spaced-apart elements 336 upward causes a dampening or reduction of energy in the hip belt 135 that is applied to the hips or thighs of an occupant of the car seat 100 during a collision, rapid deceleration or acceleration.

Figure 13:
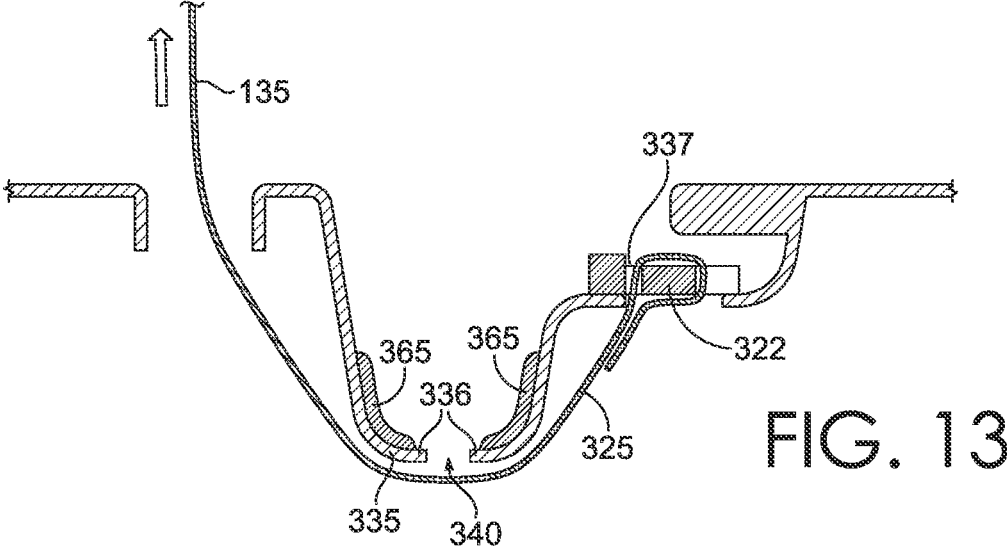
FIG. 13 illustrates a cross-sectional view of an alternative seat bottom energy dampening structure, according to an embodiment.

FIG. 13 illustrates a cross-sectional view of an alternative seat bottom energy dampening structure 315. According to this aspect of the present disclosure, deformation dampening structures 365 are disposed along an inner surface of the seat bottom deformation member 335. As this example includes the seat bottom deformation member opening 340 across the bottom of the seat bottom deformation member 335, there may be at least a pair of deformation dampening structures 365 so that each of the spaced-apart elements 336 may have at least one deformation dampening structure 365. The deformation dampening structures 365 may be in the form of control ribs, similar to the control ribs 245 described with respect to FIG. 6. As such, each of the spaced-apart elements 336 may include a plurality of control ribs or may include a single control rib. Alternatively, the deformation dampening structures 365 may be in the form of one of the other types of structures described with respect to the deformation dampening structures 247 of the seat back deformation member 220, including the structure illustrated in FIG. 7.

According to this configuration with the deformation dampening structures 365, as tension in the hip belt 135 causes the hip belt 135 to contact the bottom or lower end of the seat bottom deformation member 335 and causes a deformation of the two spaced-apart elements 336 upward, the seat bottom deformation dampening structures 365 resist or dampen the deformation or crushing of the seat bottom deformation member 335, which therefore absorbs more of the force before it can be transferred to the hips and/or thighs of the car seat occupant. As should be appreciated, a dampening of the deformation of the seat bottom deformation member 335 may be required to tune or adjust the deformation of the seat bottom deformation member 335 as required to adjust the seat bottom deformation member to different degrees of deformation.

FIG. 13 illustrates a cross-sectional view of an alternative seat bottom energy dampening structure 315, according to an embodiment. According to one aspect illustrated in FIG. 13, the hip belt 135 is illustrated as anchored beneath an upper surface of the seat bottom portion 310 as opposed to being anchored above the upper surface of the seat bottom portion 310 as illustrated in FIGS. 9-13. According to this configuration, the hip belt 135 is anchored by an anchor rod or member 360 under the upper surface of the seat bottom portion 310 before passing beneath the seat bottom deformation member 335 and then passing upward through the return belt slot 345 to the upper side of the seat bottom portion 310, but as should be appreciated, the hip belt may be anchored above the upper surface of the seat back portion 310, as illustrated in FIGS. 12 and 12.

Figure 14:
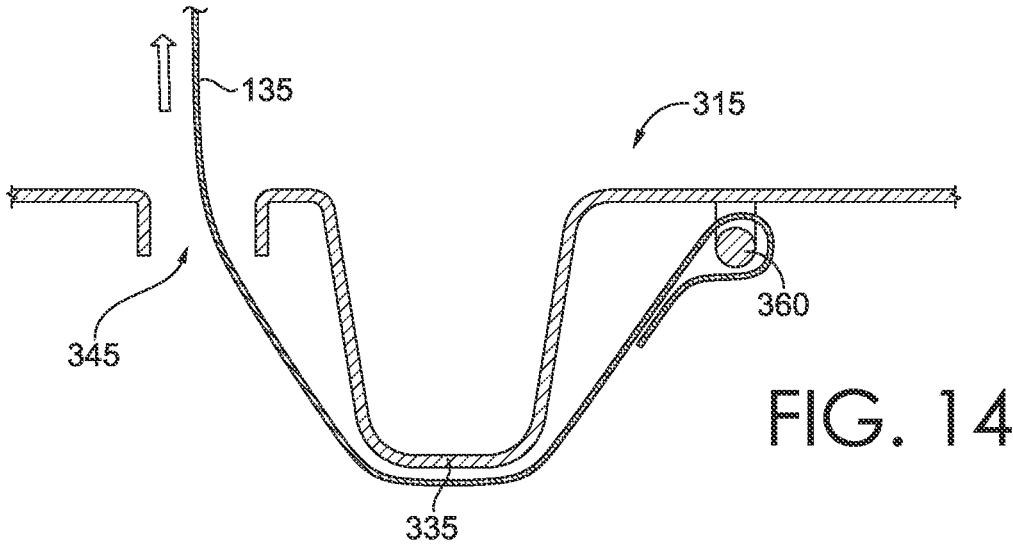
FIG. 14 illustrates a cross-sectional view of an alternative seat bottom energy dampening structure, according to an embodiment.

This alternative configuration of the seat bottom deformation member 335 does not include the seat bottom deformation member opening 340 such that the bottom or lower end of the seat bottom deformation member 335 is a continuous surface. When the car seat 100 incurs forces caused during a vehicle collision, rapid deceleration or rapid acceleration, tension in the hip belt 135 and contact of the hip belt 135 with the continuous bottom end of the seat bottom deformation member 335 causes the bottom end to deform upward or crush upward. In some aspects, more force may be required to cause deformation or crushing of the continuous bottom end of the seat bottom deformation member 335 illustrated in FIG. 14 compared to the other illustrated examples with the seat bottom deformation member opening 340. Deformation or crushing of the lower end of the seat bottom deformation member 335 causes a dampening or reduction of energy in the hip belt 135 that is applied to the hips or thighs of an occupant of the car seat 100. It will be appreciated that some examples of the seat bottom deformation member 335 with a continuous bottom surface shown in FIG. 14 may include any of the deformation dampening structures 365 described above.

Figure 15:
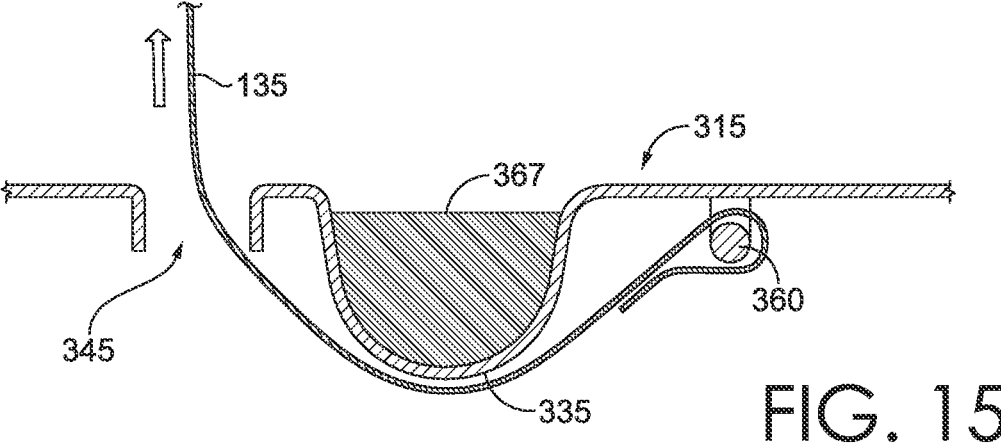
FIG. 15 illustrates a cross-sectional view of an alternative seat bottom energy dampening structure, according to an embodiment.

FIG. 15 illustrates a cross-sectional view of an alternative seat bottom energy dampening structure 315, according to an embodiment. According to this example aspect, the seat bottom deformation member 335 is a simple downwardly protruding member 335 having a curved lower surface under which the hip belt 135 passes before passing through the return belt slot 345 and to an upper surface of the seat bottom portion 310. According to this configuration, the hip belt 135 is anchored by an anchor rod or member 360 under the upper surface of the seat bottom portion 310, but as should be appreciated, the hip belt 135 may be anchored above the upper surface of the seat back portion 310, as illustrated in FIGS. 12 and 12. According to this example, a deformation dampening material 367 is included for dampening deformation of the seat bottom deformation member 335 when the hip belt 135 contacts the seat bottom deformation member 335 during a crash event, rapid deceleration or acceleration. Deformation or crushing of the lower end of the seat bottom deformation member 335 causes a dampening or reduction of energy in the hip belt 135 that is applied to the hips or thighs of an occupant of the car seat 100. According to one example, the seat bottom deformation member 335 and the deformation dampening material 367 may be in the form of an integrated unit made of a material such as plastic or foam that is selected to provide a desired deformation and resulting energy absorption.

Figure 16:
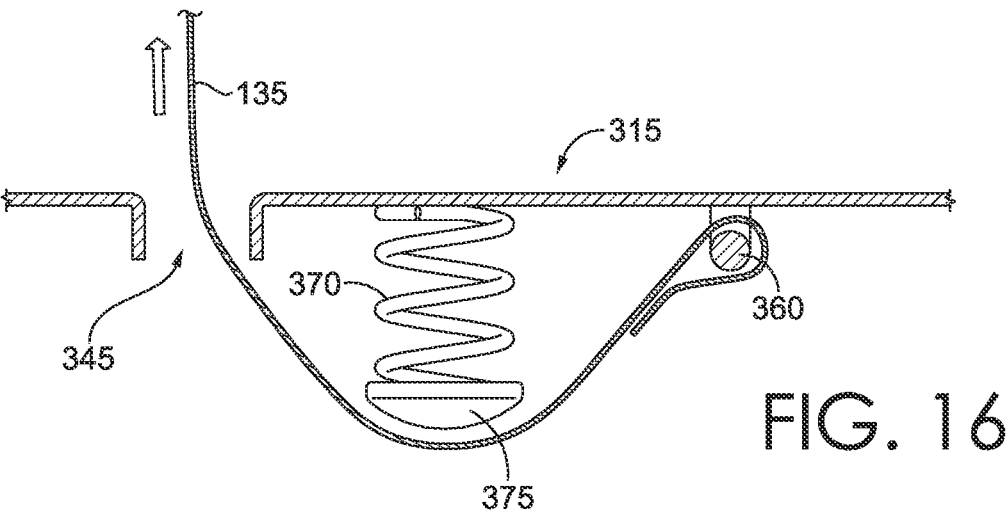
FIG. 16 illustrates a cross-sectional view of an alternative seat bottom energy dampening structure, according to an embodiment.

FIG. 16 illustrates a cross-sectional view of an alternative seat bottom energy dampening structure, according to an embodiment. According to this example, the seat bottom energy dampening structure includes an alternate deformation structure comprised of a spring 370 and a surface 375 under which the hip belt 135 passes before passing through the return belt slot 345 and to an upper surface of the seat bottom portion 310. According to this configuration, the hip belt 135 is anchored by an anchor rod or member 360 under the upper surface of the seat bottom portion 310, but as should be appreciated, the hip belt may be anchored above the upper surface of the seat back portion 310, as illustrated in FIGS. 12 and 12. According to this example, when the hip belt 135 contacts the surface 375 during a crash event, rapid deceleration or acceleration, compression of the spring 370 causes a dampening or reduction of energy in the hip belt 135 that is applied to the hips or thighs of an occupant of the car seat 100. The spring 370 may be tuned by selection of the spring type and compression characteristics to provide for energy dampening and to also provide for resistance against tension in the hip belt 135. As should be appreciated the spring 370 and surface 375 combination is but another example of variations in the seat bottom energy dampening structure that may be practiced according to embodiments of the present disclosure.

Although the seat back energy dampening structures 215 and the seat bottom energy dampening structures 315 are illustrated and described above as having two different structures, it should be understood that these structures may be interchangeable such that the seat back energy dampening structure 215 may have a deformation member similar to the seat bottom deformation member 335 described herein and/or the seat bottom energy dampening structure 315 may have a deformation member similar to the seat back deformation member 220 described herein. That is, the seat back energy dampening structure 215 may have a deformation member protruding downward toward the slot 230 for the shoulder belt; additionally, the seat bottom energy dampening structure 315 may have one structure with a leading end and a trailing end. In some embodiments, the seat back energy dampening structures 215 and the seat bottom energy dampening structures 315 utilize different types of deformation members as described herein, and in other embodi

18 ments, the same type of deformation members are used for both the seat back energy dampening structures 215 and the seat bottom energy dampening structures 315.

While one or more exemplary embodiments have been described with reference to the accompanying drawings, it will be apparent to those skilled in the art that variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. An occupant safety restraint system, comprising:
a seat structure defining a seat back and a seat bottom;
the seat back including one or more belt slots, each belt slot of the one or more belt slots receiving a restraining belt passing through the belt slot to a forward side of the seat back;
each belt slot of the one or more belt slots associated with a deformation member over which the restraining belt passes as the restraining belt passes through each of the pair of belt slots; and
each deformation member having a leading end projected from a respective belt slot and a trailing end connected to the seat back at a respective belt slot, wherein when a force is applied to the deformation member by the restraining belt during a movement of the seat structure, the leading end of the deformation member deforms toward the trailing end of the deformation member to absorb energy being applied to the deformation member by the restraining belt.

2. The occupant safety restraint system of claim 1, wherein each deformation member includes a deformation point at each of first and second sides of each deformation member, wherein each deformation point is adapted to deform when the force is applied to the leading end of the deformation member to allow the leading end of the deformation member to deform toward the trailing end of the deformation member.

3. The occupant safety restraint system of claim 2, wherein each deformation point is further adapted to break when the force is applied to the leading end of the deformation member to allow the leading end of the deformation member to deform toward the trailing end of the deformation member.

4. The occupant safety restraint system of claim 1, further comprising a deformation dampening member adapted to resist deformation of the leading end of the deformation member toward the trailing end of the deformation member when a force is applied to the leading end of the deformation member.

5. The occupant safety restraint system of claim 4, the deformation dampening member including one or more control ribs extending along a surface of the deformation dampening member from the trailing end to the leading end to resist deformation of the leading end of the deformation member toward the trailing end of the deformation member.

6. The occupant safety restraint system of claim 1, wherein the one or more belt slots are disposed in a headrest portion of the seat back.

* * * * *